Aug. 2, 1932.  H. KUHNI  1,869,757
APPARATUS FOR CONTACTING LIQUIDS AND GASES
Filed Nov. 27, 1926
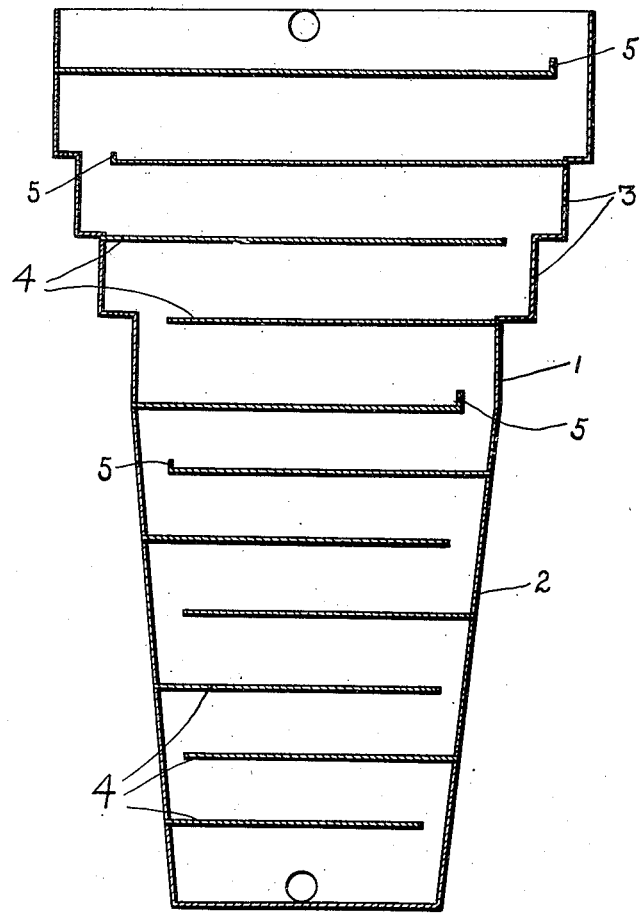
Inventor
Hans Kuhni Patented Aug. 2, 1932

1,869,757

UNITED STATES PATENT OFFICE

HANS KUHNI, OF BASEL, SWITZERLAND, ASSIGNOR TO L'AIR LIQUIDE, SOCIÉTÉ ANONYME POUR L'ETUDE ET L'EXPLOITATION DES PROCÉDÉS GEORGE CLAUDE, OF SAINT-LAZARE, PARIS

APPARATUS FOR CONTACTING LIQUIDS AND GASES

Application filed November 27, 1926, Serial No. 151,098, and in France November 28, 1925.

This invention relates to apparatus for bringing liquids and gases into contact and has special reference to the construction of columns used for distilling and rectifying. With such apparatus it is known that it is important to assist as much as possible contact between the liquid and the gas and for this purpose to transform the liquid as completely as possible into a froth or foam the bubbles of which are constituted by the gas.

The phenomena which take place on the formation of a froth or foam differ according to the nature of the liquids concerned. Thus, considering the case of the rectification of liquid air, the bubbles of gaseous oxygen traversing liquid oxygen burst at the very moment of their formation, while the bubbles of gaseous nitrogen traversing liquid nitrogen burst only after a longer period of time.

In order that the plates of an apparatus for bringing liquids and gases into contact may function in a perfect manner, it is essential that each one of the elementary parts of the gas which traverse the apparatus should form a bubble, since in each bubble there takes place a contact and exchange between the gaseous contents of the said bubble and the film of liquid surrounding it.

Gaseous oxygen traversing liquid oxygen will form bubbles that will disappear almost at once, thus leaving a fresh quantity of liquid at the disposal of the gas which continues to arrive beneath the plate and which will thus be able to form, together with the said liquid, a supply of fresh bubbles. On the other hand, the gaseous nitrogen traversing the liquid nitrogen will produce bubbles that will maintain their existence a certain time before bursting, whereby a certain quantity of liquid is locked up. Consequently, in order that liquid may be available for the formation of bubbles with the gas which continues to arrive beneath the plate, it is necessary that in this case there should be a quantity of liquid greater than that which is necessary in the case of oxygen.

Further, the ascending movement of a bubble becomes slower as the viscosity of the liquid of the bubble increases. On the other hand, as the pressure inside a spherical bubble depends upon the surface tension of the liquid, the greater the surface tension the greater will be the pressure inside the bubble and the more easily will the bubble burst when subjected to the lower pressure of the gaseous atmosphere above the plate.

Though what has been stated above appears to explain satisfactorily the observed phenomena, it must however be understood that further researches might show these explanations to be not wholly correct.

According to the present invention, in a column for bringing liquids and gases into contact the plates are constructed and arranged in such manner that the quantity of liquid, or liquid and froth, they contain is dependent upon the viscosity and surface tension of the liquid, the plates in those regions of the column where the liquid has a high viscosity and a small surface tension being adapted to contain more liquid than the plates in regions where the liquid has not so high a viscosity and a larger surface tension. In conformity with the conditions just referred to, and in the case of a column for rectifying liquid air, since the nitrogen-rich liquids have a greater viscosity and a lower surface tension than those containing less nitrogen (the relative surface tensions of the nitrogen and oxygen being in the ratio of about 8.5 to 13), the plates in the upper portion which are situated in the regions where the gases and liquids are relatively rich in nitrogen are arranged to contain more liquid, for example three times greater than the quantity of liquid rich in oxygen on the lower plates in the remainder of the column, whereby there is obtained a better rectification of the liquids and gases than in the case of an apparatus with plates as ordinarily heretofore constructed. This result can be easily obtained by increasing the height of overflow of the liquid from each plate, or by increasing the area of the plates in question, or by both these means combined. For instance the outside diameter of the rectifying column may be increased from its lower portion to its upper portion, either gradually or by way of tiers, while heretofore all the portions of a column in which liquid air or liquids more or less rich in nitrogen were rectified under practically the same pressure were made of the same diameter.

The better rectification obtained by the arrangement in accordance with the present invention is probably to be attributed to the difference of condition, as indicated by the phenomena which take place on the formation of froth previously mentioned, between the froth of the portions rich in nitrogen and the froth of the portions rich in oxygen.

The present invention takes the observed phenomena into account in the following manner, namely: The smaller the surface tension and the higher the viscosity of the liquid, the greater must be the quantity of liquid on each plate.

The accompanying drawing illustrates a diagrammatic view in section of the apparatus. The column 1 may comprise a portion 2 which increases in diameter from the lower part to the upper part, and a portion 3 which is constructed in tiers, the tiers increasing in diameter from the lower part to the upper part; or it may comprise a shape which gradually increases in diameter, or which is constructed entirely of tiers. The column is provided with a plurality of plates 4, the upper plates of which have an increasing area in order to retain a larger quantity of liquid. Some of the plates may be provided with overflow portions 5 which may increase in height from one plate to the plate above it.

The liquid, that is to say a liquid rich in nitrogen, coming from the first stage of rectification of the liquid air mentioned above, enters the upper port of the column through an opening shown at the top thereof, while the gas, i. e., the oxygen coming from the vaporizer of the liquid air rectifying apparatus, enters through the opening indicated at the base of the column.

Rectification takes place in known manner between the liquid rich in nitrogen which falls from plate to plate, and the gas which rises in the column; rectification occurring at once by the passage of the gas through the vertical stream of liquid which falls from plate to plate, and by the licking-up by the gas at the surface of the liquid on the plates.

Consequently, if the column comprises a sufficient number of plates, there will be obtained, at the base of the column, a liquid rich in oxygen which will escape through the opening represented at the base, and there will be obtained at the top of the column, a gas rich in nitrogen which escapes through the top of the column which is represented as open.

It is due to this rectification, which occurs to a slight extent on each element of the column, that the composition of the liquid varies from plate to plate; and it has been stated that the liquid rich in nitrogen—that is to say, the liquid of the upper plates—has a greater viscosity and a lower superficial tension than the liquid rich in oxygen—i. e., the liquid of the lower plates.

I claim as my invention:

1. A process for bringing in direct contact liquids and gases or vapors, which comprises the step of passing a liquid and a gaseous fluid through a rectifying column in counter-current, while varying the space for contact between liquid and gas when the viscosity of the liquid increases.

2. A process for bringing in direct contact liquids and gases or vapors, which comprises the step of passing a liquid and a gaseous fluid through a rectifying column in counter-current, while providing a greater pace for contact at points where the liquid has a higher viscosity and a smaller surface tension than at other points where the viscosity is lower and the surface tension is greater.

3. A process for bringing in direct contact liquids and gases or vapors which comprises the step of passing a liquid and a gaseous fluid through a rectifying column in counter-current, while decreasing the space for contact between liquid and gas from the entrance of the liquid in the rectifying column to the entrance of the gas in the said column.

4. In a column for bringing in direct contact liquids and gases, an inlet at its base for admitting a gaseous fluid, an inlet at the top for admitting a liquid to pass in opposite direction to the gas through the column, a plurality of superimposed plates, said plates being of greater area in those regions of the column where the liquid has a high viscosity and a small surface tension, than in those regions where the liquid has a lower viscosity and a greater surface tension.

5. In a column for bringing in direct contact liquids and gases, an inlet at its base for admitting a gaseous fluid, an inlet at the top for admitting a liquid to pass in opposite direction to the gas through the column, a plurality of superimposed plates, provided with overflow devices, said overflow devices having greater height above the respective plates in those regions of the column where the liquid has a high viscosity and a small surface tension than in those regions where the liquid has a lower viscosity and a greater surface tension.

In testimony whereof I affix my signature.

HANS KÜHNI.